(12) United States Patent
Eickemeyer et al.

(10) Patent No.: US 10,387,162 B2
(45) Date of Patent: Aug. 20, 2019

(54) EFFECTIVE ADDRESS TABLE WITH MULTIPLE TAKEN BRANCH HANDLING FOR OUT-OF-ORDER PROCESSORS

(71) Applicant: International Business Machines Corporation, Armonk, NY (US)

(72) Inventors: Richard J. Eickemeyer, Rochester, MN (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 15/709,777

(22) Filed: Sep. 20, 2017

(65) Prior Publication Data
US 2019/0087196 A1   Mar. 21, 2019

(51) Int. Cl.
G06F 9/38   (2018.01)
G06F 9/30   (2018.01)
G06F 9/34   (2018.01)

(52) U.S. Cl.
CPC .......... G06F 9/3855 (2013.01); G06F 9/3004 (2013.01); G06F 9/34 (2013.01); G06F 9/3804 (2013.01)

(58) Field of Classification Search
None
See application file for complete search history.

(56) References Cited

U.S. PATENT DOCUMENTS

| | | | | |
|---|---|---|---|---|
| 6,266,744 | B1 * | 7/2001 | Hughes | G06F 9/3834 711/123 |
| 8,131,976 | B2 * | 3/2012 | Doing | G06F 9/322 711/203 |
| 8,386,753 | B2 | 2/2013 | Eisen et al. | |
| 9,146,740 | B2 | 9/2015 | Bonanno et al. | |
| 9,298,619 | B2 | 3/2016 | Collura et al. | |
| 2006/0179277 | A1 | 8/2006 | Flachs et al. | |
| 2011/0161548 | A1 * | 6/2011 | Flachs | G06F 12/0864 711/3 |
| 2011/0321021 | A1 * | 12/2011 | Chen | G06F 8/4442 717/157 |

OTHER PUBLICATIONS

Sinharoy et al. "IBM POWER8 processor core microarchitecture." IBM Journal of Research and Development 59.1 (2015), p. 1-21.

* cited by examiner

*Primary Examiner* — Eric Coleman
(74) *Attorney, Agent, or Firm* — Cantor Colburn LLP; Jason Sosa

(57) ABSTRACT

Aspects of the invention include a computer-implemented method for executing one or more instructions by a processing unit. The method includes fetching, by an instruction fetch unit, a first instruction from an instruction cache. The method further includes associating, by an effective address table logic, an entry in an effective address table (EAT) with the first instruction. The method further includes fetching, by the instruction fetch unit, a second instruction from the instruction cache, wherein the first instruction occurs before a branch has been taken and the second instruction occurs after the branch has been taken. The method further includes associating at least a portion of the entry in the EAT associated with the first instruction in response to the second instruction utilizing a cache line utilized by the first instruction and processing the first instruction and the second instruction through a processor pipeline utilizing the entry of the EAT.

17 Claims, 7 Drawing Sheets

EFFECTIVE ADDRESS TABLE WITH MULTIPLE TAKEN BRANCH HANDLING FOR OUT-OF-ORDER PROCESSORS

BACKGROUND

Embodiments of the present invention relate in general to an out-of-order (OoO) processor and more specifically to an effective address table (EAT) data structure that can allow multiple taken branches to utilize the same EAT.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

The EAT data structure is often used by OoO processors. The EAT is typically comprised of one or more entries with each entry having a plurality of fields of information associated with a group of instructions. Each entry in the EAT is created in response to a fetch of an instruction type requiring a new cache line of the OoO processor. A branch instruction in which a branch is taken is an instruction that requires a new EAT entry. Accordingly, with each branch taken a new EAT entry is required causing the size of the EAT data structure to increase.

SUMMARY

One or more embodiments of the present invention include methods, systems, and computer program products for an effective address table with multiple branch taken handling. A non-limiting example of the computer-implemented method includes fetching, by an instruction fetch unit, a first instruction from an instruction cache. The method further includes associating, by an effective address table logic, an entry in an effective address table (EAT) with the first instruction. The method further includes fetching, by the instruction fetch unit, a second instruction from the instruction cache, wherein the first instruction occurs before a branch has been taken and the second instruction occurs after the branch has been taken. The method further includes associating, by the effective address table logic, at least a portion of the entry in the EAT associated with the first instruction in response to the second instruction utilizing a cache line utilized by the first instruction. The method further includes processing the first instruction and the second instruction through a processor pipeline utilizing the entry of the EAT.

One or more embodiments of the present invention are directed to a system. A non-limiting example of the system includes one or more processors in communication with one or more types of memory. The system can include an instruction fetch unit (IFU) configured for fetching a first instruction from an instruction cache and further configured to fetch a second instruction from the instruction cache, wherein the first instruction occurs before a branch has been taken and the second instruction occurs after the branch has been taken. The system can also include an effective address table logic configured to associate an entry in an effective address table (EAT) with the first instruction and further configured to associate at least a portion of the entry in the EAT associated with the first instruction in response to the second instruction utilizing a cache line utilized by the first instruction. The one or more processors of the system are configured to process the first instruction and the second instruction through a processor pipeline of the one or more processors utilizing the entry of the EAT.

One or more embodiments of the present invention are directed to a computer program product. A non-limiting example of the computer program product includes a storage medium readable by a processor that can store instructions for execution by the processor to perform operations. The computer program product can also fetch a first instruction from an instruction cache. The computer program product can also associate an entry in an effective address table (EAT) with the first instruction. The computer program product can also fetch a second instruction from the instruction cache, wherein the first instruction occurs before a branch has been taken and the second instruction occurs after the branch has been taken. The computer program product can also associate at least a portion of the entry in the EAT associated with the first instruction in response to the second instruction utilizing a cache line utilized by the first instruction. The computer program product can also process the first instruction and the second instruction through a processor pipeline utilizing the entry of the EAT.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
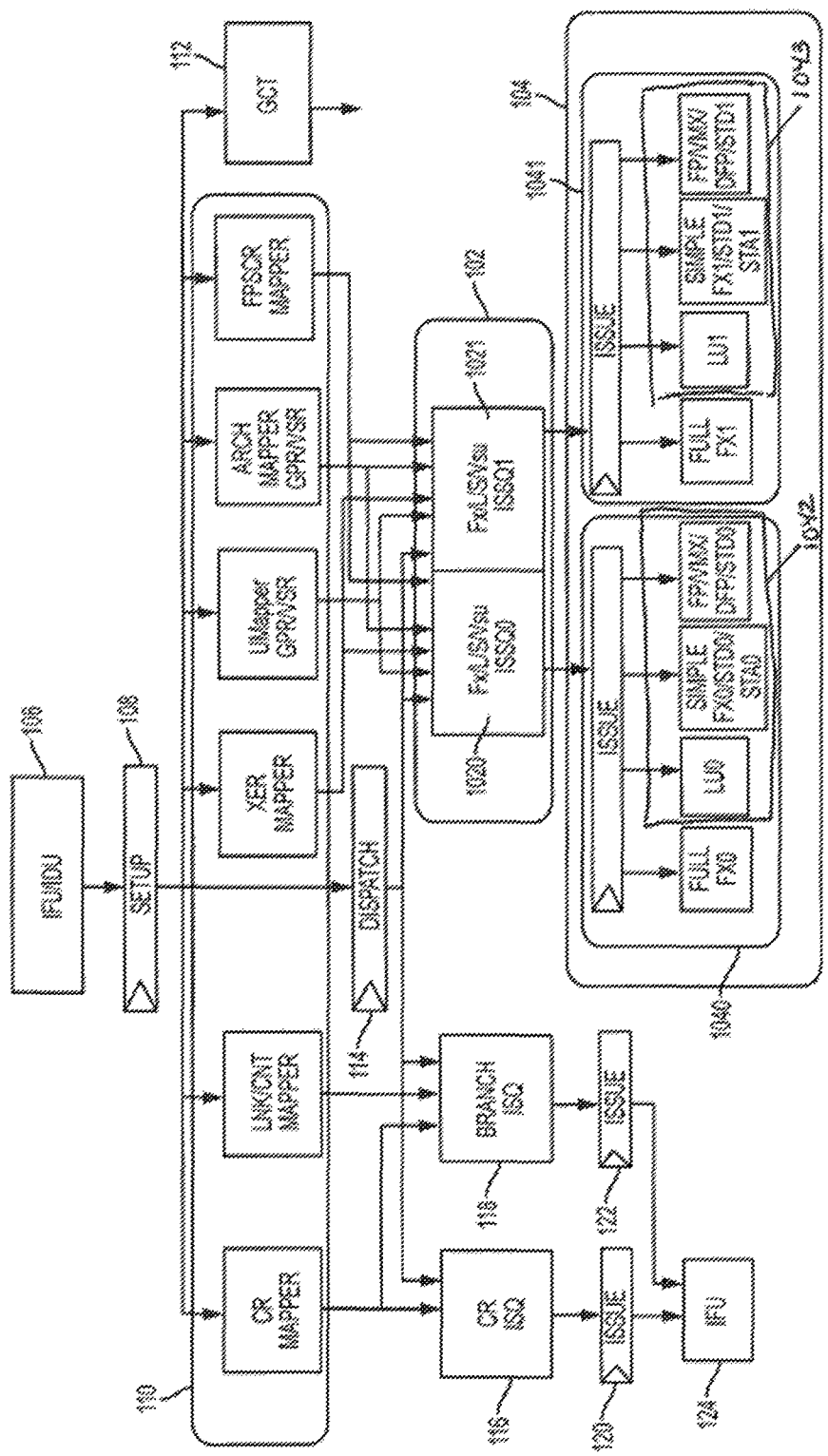
FIG. 1 depicts a block diagram of a system that includes an out-of-order (OoO) processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention described herein provide an effective address table (EAT) data structure that can allow multiple taken branches to utilize the same EAT. The technical solutions described herein are related to an EAT entry using additional fields that allow sharing of the EAT entry by multiple taken branches instead of creating a new EAT entry after each branch taken in order to facilitate reduction in chip area and power consumption of out-of-order (OoO) processors.

Most modern computing devices provide support for virtual memory. Virtual memory is a technique by which application programs are given the impression that they have a contiguous working memory, or address space, when in fact the physical memory may be fragmented and may even overflow onto disk storage. Essentially, the application program is given a view of the memory of the computing device where the application accesses a seemingly contiguous memory using an EA, in the EA space visible to the application, which is then translated into a physical address of the actual physical memory or storage device(s) to actually perform the access operation. An EA is the value which is used to specify a memory location that is to be accessed by the operation from the perspective of the entity, e.g., application, process, thread, interrupt handler, kernel component, etc., issuing the operation.

That is, if a computing device does not support the concept of virtual memory, then the EA and the physical address are one and the same. However, if the computing device does support virtual memory, then the EA of the particular operation submitted by the application is translated by the computing device's memory mapping unit into a physical address, which specifies the location in the physical memory, or storage device(s) where the operation is to be performed.

Further, in modern computing devices, processors of the computing devices use processor instruction pipelines, comprising a series of data processing elements, to process instructions (operations) submitted by entities, e.g., applications, processes, etc. Instruction pipelining is a technique to increase instruction throughput by splitting the processing of computer instructions into a series of steps with storage at the end of each step. Instruction pipelining facilitates the computing device's control circuitry to issue instructions to the processor instruction pipeline at the processing rate of the slowest step, which is much faster than the time needed to perform all steps at once. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

Such pipelined processors may take the form of in-order or OoO pipelined processors. For in-order pipelined processors, instructions are executed in order such that if data is not available for the instruction to be processed at a particular stage of the pipeline, execution of instructions through the pipeline may be stalled until the data is available. OoO pipelined processors, on the other hand, allow the processor to avoid stalls that occur when the data needed to perform an operation are unavailable. The OoO processor instruction pipeline avoids these stalls by filling in "slots" in time with other instructions that are ready to be processed and then re-ordering the results at the end of the pipeline to make it appear that the instructions were processed in-order. The way the instructions are ordered in the original computer code is known as program order, whereas in the processor they are handled in data order, i.e. the order in which the data and operands become available in the processor's registers.

Modern processor instruction pipelines track an instruction's EA as the instruction flows through the instruction pipeline. It is important to track the instruction's EA because this EA is utilized whenever the processing of an instruction results in the taking of an exception, the instruction flushes to a prior state, the instruction branches to a new memory location relative to its current memory location, or the instruction completes its execution.

Tracking an instruction's EA is costly in terms of processor chip area, power consumption, and the like. This is because these EAs have large sizes (e.g., 64 bits) and modern processor instruction pipelines are deep, i.e. have many stages, causing the lifetime of an instruction from an instruction fetch stage of the processor instruction pipeline to a completion stage of the processor instruction pipeline to be very long. This cost may be further increased in highly multithreaded OoO processors, i.e. processors that execute instructions from multiple threads in an out-of-order manner, since a vast number of instructions from different address ranges can be processing, i.e. are "in flight," at the same time.

Turning now to FIG. 1, a block diagram of a system 100 that includes an instruction sequencing unit (ISU) of an out-of-order (OoO) processor for implementing the technical solutions for an effective address based instruction fetch unit is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed-point instructions (FX), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in single threaded (ST) mode, the issue queue 102 can be used as a single logical issue queue that contains both ISQ0 1020 and ISQ1 1021 to process all of the instructions (in this example all N instructions) of a single thread.

When the processor is executing in multi-threaded (MT) mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units, 1040 and 1041. Both groups of execution units, 1040 and 1041, that are shown in FIG. 1, include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FP/VMX/DFP/STD0 form a load-store unit (LSU) 1042. Similarly, the LU1, the Simple FX1/STD1/STA1, and the FP/VMX/DFP/STD1 form a load-store unit (LSU) 1043. The two LSUs 1042 and 1043 together are referred to as an LSU of the system 100.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
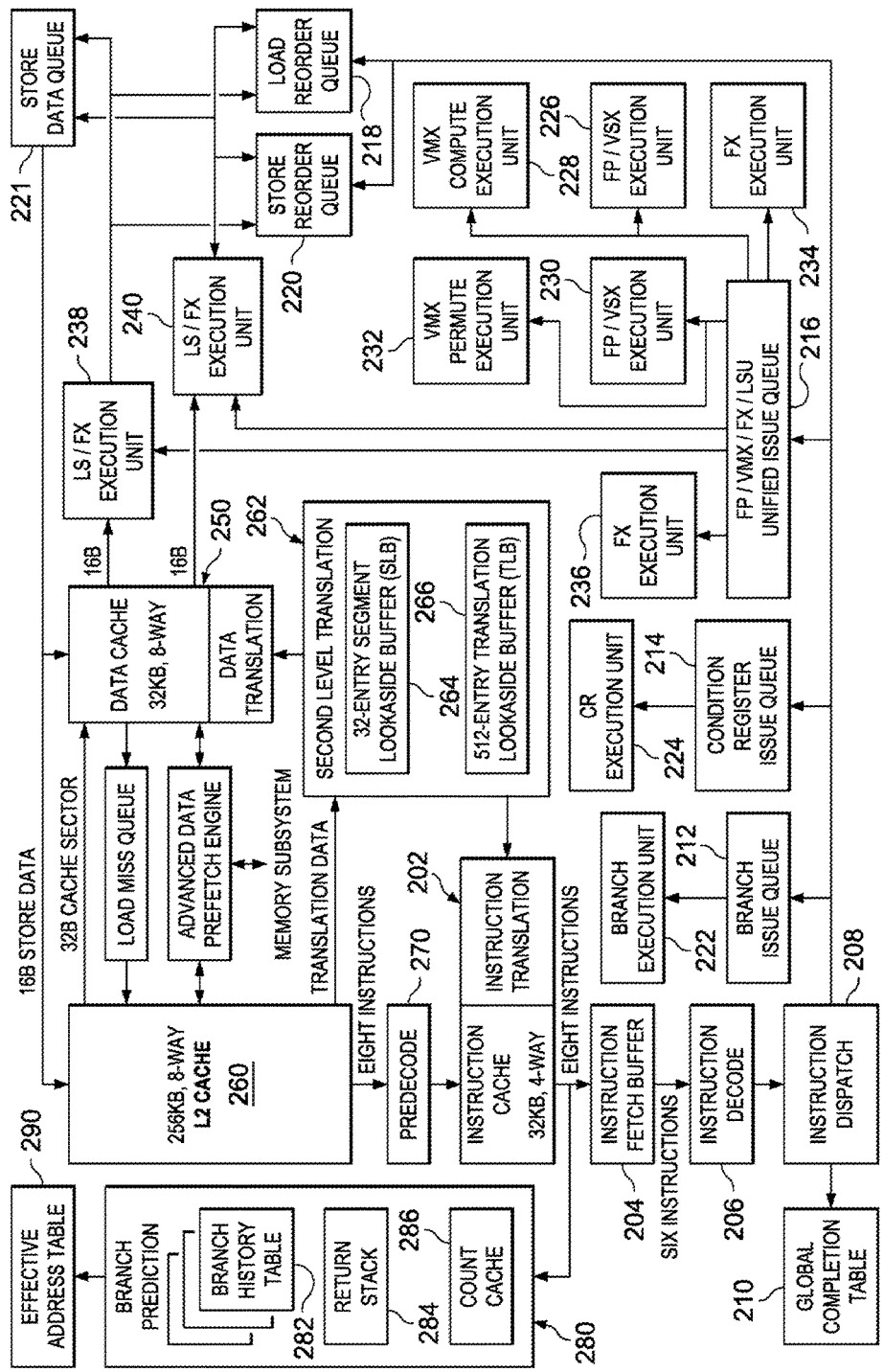
FIG. 2 is an exemplary block diagram of an OoO processor architecture in accordance with one or more embodiments of the present invention.

In one or more examples, the system 100, in accordance with the illustrative embodiments, is an OoO processor. FIG. 2 is an exemplary block diagram of the OoO processor of FIG. 1, including an effective address table (EAT) logic and the associated mechanisms for utilizing the EAT by the IFU/IDU 106, are implemented according to one or more embodiments of the present invention. As shown in FIG. 2, the processor architecture includes an instruction cache (I-cache) 202, an instruction fetch buffer 204, an instruction decode unit 206, and an instruction dispatch unit 208. Instructions are fetched by the instruction fetch buffer 204 from the I-cache 202 and provided to the instruction decode unit 206. The instruction decode unit 206 decodes the instruction and provides the decoded instruction to the instruction dispatch unit 208. The output of the instruction dispatch unit 208 is provided to the global completion table 210 and one or more of the branch issue queue 212, the condition register issue queue 214, the unified issue queue 216, the load reorder queue 218, and/or the store reorder queue 220, depending upon the instruction type. The instruction type is determined through the decoding and mapping of the instruction decode unit 206. The issue queues 212-220 provide inputs to various ones of execution units 222-240. The data cache 250, and the register files contained with each respective unit, provides the data for use with the instructions.

The instruction cache 202 receives instructions from the L2 cache 260 via the second level translation unit 262 and pre-decode unit 270. The second level translation unit 262 uses its associate segment look-aside buffer 264 and translation look-aside buffer 266 to translate addresses of the fetched instruction from EAs to system memory addresses. The pre-decode unit partially decodes instructions arriving from the L2 cache and augments them with unique identifying information that simplifies the work of the downstream instruction decoders.

The instructions fetched into the instruction fetch buffer 204 are also provided to the branch prediction unit 280 if the instruction is a branch instruction. The branch prediction unit 280 includes a branch history table 282, return stack 284, and count cache 286. These elements predict the next EA that should be fetched from the instruction cache. A branch instruction is a point in a computer program where flow of control is altered. It is the low-level machine instruction that is generated from control constructs in a computer program, such as if-then-else or do-while statements. A branch can be not taken, in which the flow of control is unchanged and the next instruction to be executed is the instruction immediately following it in memory, or it can be taken, in which the next instruction to be executed is an instruction at some other place in memory. If the branch is taken, a new EA needs to be presented to the instruction cache.

The EA and associated prediction information from the branch prediction unit are written into an EAT logic unit 290. This EA is later confirmed by the branch execution unit 222. If correct, the EA remains in the directory until all instructions from this address region have completed their execution. If incorrect, the branch execution unit flushes out the address and the corrected address is written in its place. The EAT logic unit 290 also includes logic that facilitates using the directory as a CAM.

Instructions that read from or write to memory (such as load or store instructions) are issued to the LS/EX execution unit 238, 240. The LS/EX execution unit retrieves data from the data cache 250 using a memory address specified by the instruction. This address is an effective address and needs to first be translated to a system memory address via the second level translation unit before being used. If an address is not found in the data cache, the load miss queue is used to manage the miss request to the L2 cache. In order to reduce the penalty for such cache misses, the advanced data prefetch engine predicts the addresses that are likely to be used by instructions in the near future. In this manner, data will likely already be in the data cache when an instruction needs it, thereby preventing a long latency miss request to the L2 cache.

The LS/EX execution unit 238, 240 executes instructions out of program order by tracking instruction ages and memory dependences in the load reorder queue 218 and store reorder queue 220. These queues are used to detect when OoO execution generated a result that is not consistent with an in-order execution of the same program. In such cases, the current program flow is flushed and performed again.

The processor architecture further includes the EAT logic unit 290 that maintains the effective address of a group of instructions in a centralized manner such that the EA is available when needed but is not required to be passed through the pipeline. Moreover, the EAT logic unit 290 includes circuitry and/or logic for supporting OoO processing. FIG. 2 shows the EAT logic unit 290 being accessed via the branch prediction unit 280, however, it should be appreciated that circuitry may be provided for allowing various ones of the units shown in FIG. 2 to access the EAT logic unit 290 without having to go through the branch prediction unit 280.

Figure 3:
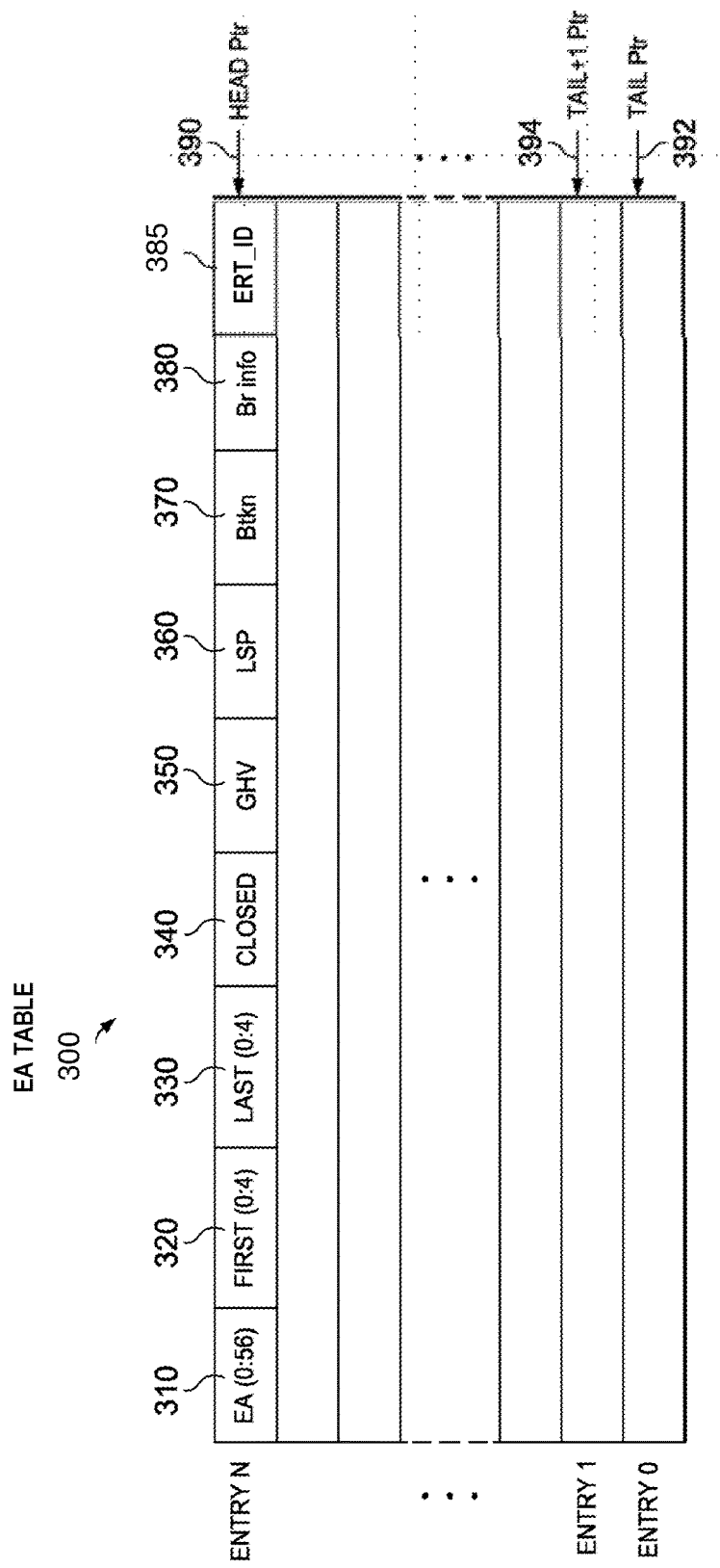
FIG. 3 is an example block of a contemporary effective address table (EAT) structure in accordance with one or more embodiments of the present invention.

FIG. 3 is an exemplary block of a contemporary effective address table data structure (EAT) 300 of an L1 cache in accordance with one illustrative embodiment. In one or more examples, the EAT is part of the LSU 1042. As shown in FIG. 3, the EAT 300 is comprised of one or more entries, e.g., entry 0 to entry N, with each entry comprising a plurality of fields of information regarding a group of one or more instructions. For example, in one illustrative embodiment, each entry in the EAT 300 may represent between 1 and 32 instructions. Entries in the EAT 300 are created in response to a fetch of an instruction that is in a new cache line of the processor cache, e.g., the L2 cache 260 in FIG. 2. The entry in the EAT 300 is updated as additional instructions are fetched from the cache line. Each entry of the EAT 300 is terminated on a taken branch (i.e. a fetched branch instruction from the cache is resolved as "taken"), cache line crossing (i.e. the next fetched instruction is in a different cache line from the current cache line), or a flush of the processor pipeline (such as when a branch misprediction occurs or the like).

As shown in FIG. 3, the fields of the EAT 300 comprise a base effective address 310, a first instruction identifier field 320, a last instruction identifier field 330, a closed identifier field 340, a global history vector field 350, a link stack pointer field 360, a branch taken identifier field 370, and a branch information field 380. A head pointer 390 points to the head, or youngest entry, in the EAT 300. A tail pointer 392 points to the tail, or oldest entry, in the EAT 300. In addition, a tail+1 pointer 394 is provided for pointing to the entry in the EAT 300 that is second to the tail, or oldest, entry in the EAT 300.

The base effective address 310 is the starting EA of the group of instructions. Each instruction in the group of instructions has the same base EA and then an offset from it. For example, in one illustrative embodiment, the EA is a 64-bit address comprising bits 0:63. The base EA may comprise, in one illustrative embodiment, bits 0:56 of this EA with bits 57:61 representing the offset from the base EA for the specific instruction within the group of instructions. Bits 62 and 63 point to a specific byte of each instruction. In the illustrative embodiment, each address references an instruction that is 32 bits long (i.e. 4 bytes), where each byte in memory is addressable. An instruction cannot be further divided into addressable subcomponents, and thus an instruction address will always have bits 62 and 63 set to zero. Therefore, bits 62 and 63 do not need to be stored and can always be assumed to be zero by the EAT.

The first instruction identifier field 320 stores the effective address offset bits, e.g., bits 57:61 of the EA for the first instruction in the group of instructions to which the EAT 300 entry corresponds. A combination of the base EA from field 310 and the effective address offset bits in the first instruction identifier field 320 provides the EA for the first instruction in the group of instructions represented by the EAT 300 entry. This first field 320 may be used, as discussed hereafter, for recovering a refetch address and branch prediction information in the event that the pipeline is flushed, for example.

The last instruction identifier field 330 stores the effective address offset bits, e.g., bits 57:61 of the EA, for the last instruction in the group of instructions to which the EAT 300 entry corresponds. EAT logic 290 updates this field as additional instructions in the group of instructions represented by the EAT 300 entry are fetched. The EAT logic 290 discontinues updating of this field 330 in the particular EAT 300 entry in response to the EAT 300 entry being closed when a cache line crossing or taken branch is found. This field will remain intact unless a pipeline flush occurs that clears out a portion of the EAT 300 entry. In such cases, the EAT logic 290 updates this field to store the effective address offset bits of the instruction that is now the new last instruction in the entry as a result of the flush. This field is ultimately used for completion, as discussed hereafter, to release the entry in the EAT 300.

The closed identifier field 340 is used to indicate that the EAT 300 entry has been closed and no more instruction fetches will be made to fetch instructions for the instruction group corresponding to the EAT 300 entry. An EAT 300 entry may be closed for a variety of different reasons, including a cache line crossing, a branch being taken, or a flush of the pipeline. Any of these conditions may result in the value in the closed identifier field 340 being set to indicate the EAT 300 entry is closed, e.g., set to a value of "1." This field 340 is used at completion to release an entry in the EAT 300, as discussed in greater detail hereafter.

The global history vector field 350 identifies the global history vector for the first instruction fetch group that created the entry in the EAT 300. The global history vector is used to identify a history of whether branches were taken or not taken, as discussed in greater detail hereafter. The global history vector is used for branch prediction purposes to help in determining, based on the recent history of branches being taken or not taken, whether a current branch is likely to be taken or not.

The link stack pointer field 360 identifies the link stack pointer for the first instruction fetch group that created the entry in the EAT 300. The link stack pointer is another branch prediction mechanism that will be described in greater detail hereafter.

The branch taken identifier field 370 indicates whether the group of instructions corresponding to the EAT 300 entry had a branch instruction in which the branch was taken. The value in the branch taken identifier field 370 is updated in response to a branch instruction of the instruction group represented by the EAT 300 entry being predicted as taken. In addition, once a branch in the instructions of the EAT 300 entry is taken, the EAT 300 entry is also closed by writing the appropriate value to the closed field 340. Since the branch taken field is written speculatively at prediction time, it may need to be replaced with the correct value when the branch is actually executed. For example, a branch could be predicted as not taken, in which case a "0" would be written into the branch taken field. However, later in execution, the branch could be found to be taken, in which case the field must be corrected by writing it to a value of "1." The second write only occurs if the branch was mispredicted.

The branch information field 380 stores miscellaneous branch information that is used for updating branch prediction structures when a branch resolves, or architected EA state when a branch instruction completes.

Entries in the EAT 300 are accessed using an effective address tag (eatag) that comprises at least two parts: base eatag and an eatag offset. In one illustrative embodiment, this eatag is a 10-bit value, which is relatively much smaller than the 64-bit EA. With a 10 bit eatag value, and a EAT 300 having a size of 14 entries, in one exemplary implementation, the eatag is comprised of a first 5 bits, referred to as the base eatag, for identifying an entry within the EAT 300 and a second 5 bits, referred to as the eatag offset, for providing the offset of the specific instruction within the group of instructions represented by the entry in the EAT 300. A first bit in the 5 bits identifying the entry within the EAT 300 may be used as a wrap bit to indicate whether a wrap occurred when going from the topmost entry to the bottom most entry of the EAT 300. This may be used for age detection. The second through fifth bits of the 5 bits identifying the entry within the EAT 300 may be used to index into the EAT to identify the base EA of the instruction, i.e. EA(0:56). The 5 bit offset value may be used to provide, for example, bits 57:61 of the particular instruction's EA. This example eatag is illustrated below:

eatag(0:9)=row(0:4)‖offset(0:4)

row(0): Wrap bit for the EAT indicating whether or not a wrap occurred when going from the topmost entry to bottom most entry of the EAT.

row(1:4): Index into 14-entry EAT used to determine EA(0:56) of the instruction.

offset(0:4): Bits 57:61 of the instruction's EA.

Figure 4:
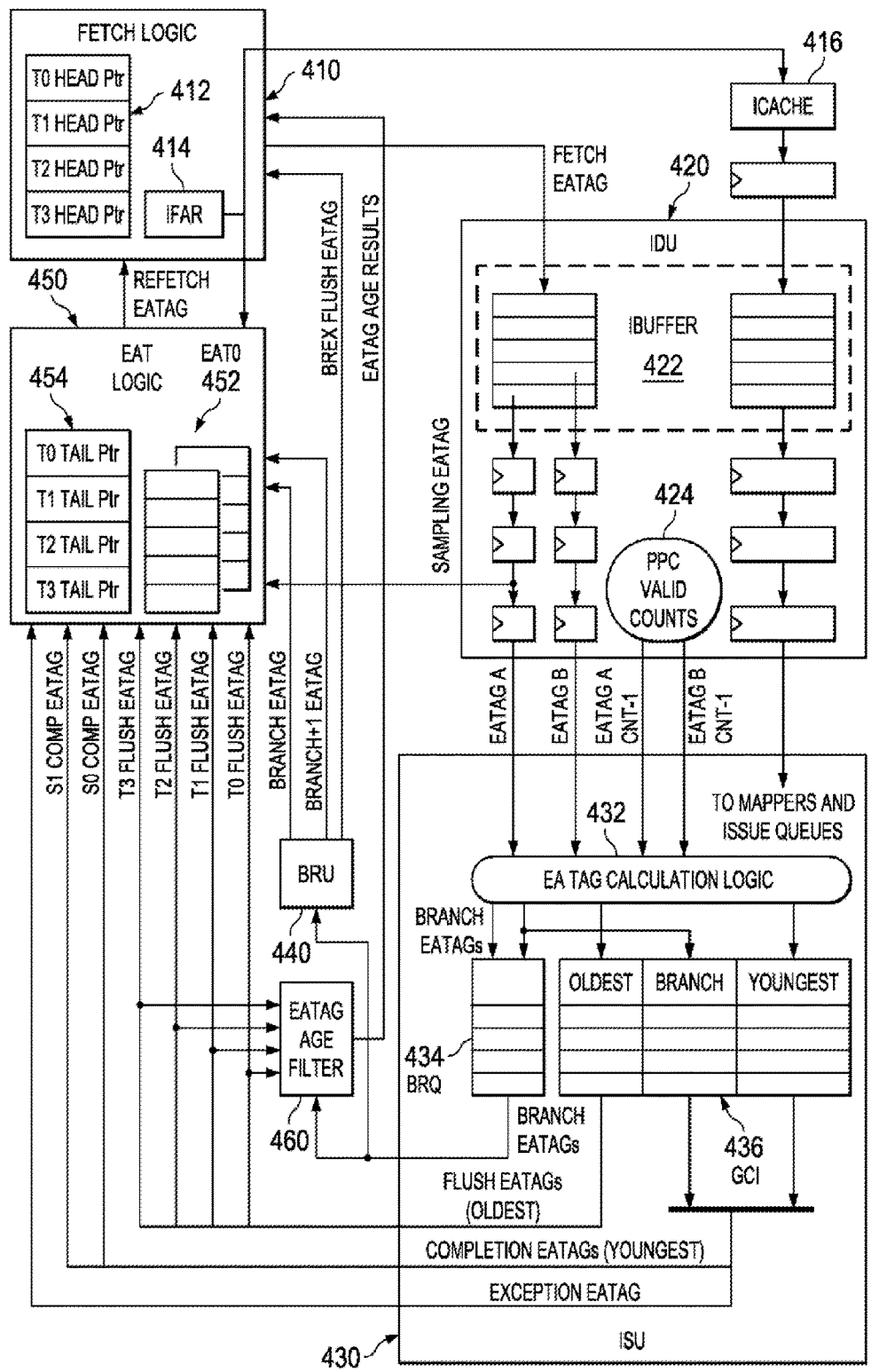
FIG. 4 illustrates an exemplary dataflow between elements of a processor implementing an EAT in accordance with one or more embodiments of the present invention.

As shown in FIG. 4 the primary operational elements of the processor architecture that utilize the EAT 300 are the fetch logic 410, the instruction dispatch unit (IDU) 420, the instruction sequencer unit 430, the branch execution unit (BRU) 440, and the effective address table logic 450. The fetch logic 410, in one illustrative embodiment, corresponds to the front-end elements of processor architecture depicted in FIG. 2. These elements are the instruction cache 202 and branch prediction unit 280, which are responsible for fetching instructions from given effective address and generating the next effective address to fetch. The IDU 420 corresponds to the next sequential portion of the processor architecture in FIG. 2. These are the instruction fetch buffer 204 and instruction decode unit 206. The instruction sequencer unit 430 is a collection of the sequencing and global control elements of the processor architecture in FIG. 2. These elements are instruction dispatch unit 208, global completion table 210, and the issue queues 212-21. Each collection of elements, referred to by their collective unit name hereafter, utilize the central EAT structure when address information is needed in the pipeline.

With these mechanisms and the configuration of the EAT 300 previously discussed, an eatag is assigned for an instruction fetch group, e.g., a group of 8 instructions, based on the current head pointer of the EAT 300, where the head pointer points to the first available entry in the EAT 300. All instructions in the instruction fetch group have the same base eatag (bits 0:4). The instructions in the instruction fetch group will have different eatags with regard to the second 5 bits (bits 5:9) of the eatag, which represent the specific instruction's offset from the base eatag. The base eatag is sent to the IDU 420 where it is stored in the instruction buffer 422 with the instructions from the instruction cache 416. The next fetch of an instruction fetch group may be to the same base eatag if a condition does not occur requiring a new entry in the EAT 300 to be assigned, i.e. the base EA(0:56) is the same and thus the same entry in the EAT 300 can be used. The instruction fetch logic 410 assigns a new entry in the EAT 300 only when there is a cache line crossing or taken branch detected. In one illustrative embodiment, a cache line of the L2 cache may contain up to 32 instructions and thus, each EAT entry can represent up to 32 instructions.

In the depicted exemplary embodiment, within the IDU 420, instructions in the instruction buffer 422 are grouped into global completion table (GCT) instruction groups of up to 6 instructions (e.g. 4 non-branch instructions and 2 branch instructions). A set of eatags are calculated for the 6 instructions. The group formation may look across two different rows in the instruction buffer 422, which may contain instructions from up to 2 different ranges. Therefore, 2 base eatags are needed to represent the GCT instruction group. In addition, a count of the number of instructions, in each EA range, i.e. EAT entry, from each base EA represented by the 2 base eatags, in the GCT instruction group is determined by the POWER PC (PPC) valid count logic 424. The 2 base eatags and the 2 count values, i.e. PPC valid count values, are sent to the instruction sequencer unit (ISU) 430 with the instructions.

The grouping of instructions into GCT instruction groups helps to facilitate out-of-order execution. Out-of-order processor pipeline architectures track groups of instructions rather than individual instructions in order to reduce the overhead and complexity of actions such as out-of-order flushes. For example, in a machine using groups of instructions, the register rename state only needs to be checkpointed per group rather than per instruction. With the use of the EAT logic 450 and the EAT facilities 412, 452, and 454, group formation across multiple disjoint address ranges is made possible. This allows more dense groups of instructions to be created since only an additional base eatag needs to be tracked per GCT instruction group EA address range rather than an entire 64-bit address. In addition, flushing only a portion of a GCT instruction group becomes possible since flush EAs are calculated on the fly using eatags. Completion using the EAT logic 450 and EAT 452 can naturally handle GCT instruction groups with instructions from multiple EA ranges.

The eatag calculation logic 432 of the ISU 430 calculates 3 eatags from the 2 base eatags supplied by the IDU 420, the PPC valid counts for these 2 eatags, obtained from the PPC valid count logic 424 of the IDU 420, and a third piece of information, branch age, also obtained from the PPC valid count logic 424, which is the offset of the first branch instruction relative to the first base eatag. These 3 eatags are calculated by the eatag calculation logic 432 of the ISU 430 as instructions are placed into the instruction queues (not shown) and upon creation of a global completion table (GCT) entry for the GCT instruction group. A first calculated eatag is the eatag of the first instruction in the GCT instruction group. The first calculated eatag may be calculated by adding the offset of the first instruction to the first base eatag supplied by the IDU 420. A second calculated eatag is the eatag of the last instruction in the GCT instruction group. Again, the second calculated eatag may be calculated by adding the offset of the last instruction in the GCT to the second base eatag supplied by the IDU 420. However, if only one base eatag is utilized, then the first and second calculated eatags may be calculated based on the same base eatag.

A third calculated eatag is the eatag of each branch instruction in the GCT instruction group (there may be up to 2 branch instructions and thus, 2 branch eatags, since each entry in the EAT is terminated upon the occurrence of a taken branch). The first branch eatag may be calculated by adding the branch age supplied by the PPC valid count logic 424 to the first base eatag supplied by the IDU 420. Since groups are terminated on the occurrence of a second branch, the second branch eatag is always the last eatag in the group. This eatag may be calculated by first determining if one or two base eatags are utilized by the group. Valid bits are sent from the IDU 420 to the ISU 430 to communicate when one or two base eatags are utilized. If one base eatag is in use, the second branch eatag is calculated by adding the PPC valid count for the first eatag to the first base eatag. If two base eatags are in use, the second branch eatag is calculated by adding the PPC valid count for the second base eatag. The eatag for the first instruction, the last instruction, and the first branch instruction are stored in the global completion table 436. They will remain there until they are needed for pipeline flush events or until they are completed and removed from the global completion table 436. The handling of such events is described in detail hereafter.

Up to 2 branch eatags are stored in the branch issue queue (BRQ) 434. These eatags will remain in the BRQ until the time their specific branch instruction is issued. In this exemplary embodiment, only one branch instruction is chosen from the BRQ to issue at a time. Once chosen to execute, the branch eatag of the branch instruction is sent to the branch execution unit (BRU) 440. This branch eatag is used to calculate the effective address (EA) of the branch instruction, which is needed later to determine the flush address, link register address, and to update the branch prediction structures such as the global branch history vector. In addition, the branch eatag is used to calculate the new EAT head pointer when a branch instruction flushes. These operations are described in greater detail hereafter.

The eatag of the oldest instruction in a GCT instruction group is sent out to the EAT logic when a group flushes. This eatag is used to calculate the EA to start fetching from after the flush. The eatag of the oldest instruction is also used to determine the new EAT head pointer and to restore the branch prediction structures, such as the global branch history vector, as described in greater detail hereafter.

In an out-of-order execution, instructions can flush out-of-order. Eatag age filtering logic 460 uses the eatags of the flushes to determine the age of flushes relative to each other. Younger flushes that become invalid due to older flushes are filtered out and take no action. This flush filtering will be described in greater detail hereafter.

The eatag of the youngest valid instruction in a GCT instruction group is sent out to the EAT logic when a group completes. This eatag is used to update the tail pointer of the EAT, which in turn retires an entry. The eatag of the youngest valid instruction in the GCT instruction group is also used to calculate the current instruction address (CIA) and various sampling/debug address registers that are typically updated when a group completes.

Moreover, eatags are also used to compute the next instruction address (NIA), when an instruction in a GCT instruction group is taking an exception. This address will be stored into save and restore registers in order to return to the current program flow after an exception is serviced. These save and restore registers are temporary storage areas which hold data from current program flow so that the processor remembers where to return after the exception has been processed. The EAT may be used to provide the NIA, which is the "return-to" address for such cases. When an exception occurs, the ISU 430 determines if the oldest or youngest eatag should be used. This is determined by the type of exception that has occurred. If the current GCT instruction group must be executed again after the exception processing, then the oldest eatag is used since control will resume at the start of this GCT instruction group. If the current instruction group will not be executed again, but will instead complete before taking the exception, then the youngest eatag is used since control will resume at the start of the next GCT instruction group. The EAT logic 450 generates the NIA from the eatag that is sent from the ISU 430 for such cases.

As mentioned above, the use of the EAT logic 450 and facilities 412 and 452-454 aids out-of-order processing of instructions by facilitating the grouping of instructions into GCT instruction groups that are tracked according to the eatag(s) corresponding to the EA range(s) in the GCT instruction group rather than having to track multiple 64-bit addresses. The GCT instruction group may be formed across multiple disjoint EA ranges such that each EA range is represented by an eatag rather than one or more 64-bit addresses. In the depicted example embodiment, the GCT instruction group may encompass instructions from up to two disjoint EA ranges Those of ordinary skill in the art will appreciate that the hardware in FIGS. 1-4 may vary depending on the implementation. Other internal hardware or peripheral devices, such as flash memory, equivalent non-volatile memory, or optical disk drives and the like, may be used in addition to or in place of the hardware depicted in FIGS. 1-4. In addition, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device configured with flash memory to provide non-volatile memory for storing operating system files and/or user-generated data, for example. Essentially, data processing system 100 may be any known or later developed data processing system without architectural limitation.

As will be appreciated by one skilled in the art, the present invention may be embodied as a system, apparatus, or method. In one illustrative embodiment, the mechanisms are provided entirely in hardware, e.g., circuitry, hardware modules or units, etc. of a processor. However, in other illustrative embodiments, a combination of software and hardware may be utilized to provide or implement the features and mechanisms of the illustrative embodiments. The software may be provided, for example, in firmware, resident software, micro-code, or the like. The various flowcharts set forth hereafter provide an outline of operations that may be performed by this hardware and/or combination of hardware and software.

In illustrative embodiments in which the mechanisms of the illustrative embodiments are at least partially implemented in software, any combination of one or more computer usable or computer readable medium(s) that store this software may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), etc.

The effective address table (EAT) data structure is typically comprised of a plurality of fields having one or more entries with each entries related to a group (e.g., 32) of instructions. Each entry in the EAT is created in response to a fetch of an instruction in a new cache line of the processor (L2) cache. Each EAT entry comprises a plurality of fields, each field having one or more bits. The fields include a base effective address (EA), a first instruction identifier (FIRST), a last instruction identifier (LAST), a closed identifier (CLOSED), a global history vector field (GHV), a link stack pointer field (LSP), a branch taken identifier (BTKN), and a branch information field (BRINFO).

Whenever a branch instruction is taken when using the typical EAT, a new entry in the EAT is created. When handling instruction workloads, typically more than half the branch instructions are taken branches, which results in a new EAT entry being created for every few instructions fetched. Accounting for all the new entries in the EAT requires a greater amount of chip area and power utilized to be able to track the typically large amount of taken branches.

In the technical solutions described herein, a new EAT data structure is created that allows multiple taken branches to utilize the same EAT entry. The EAT allows multiple taken branches to share a single copy of certain fields in an EAT entry that has already been created thereby reducing the chip area and power utilized by an OoO processor.

Figure 5:
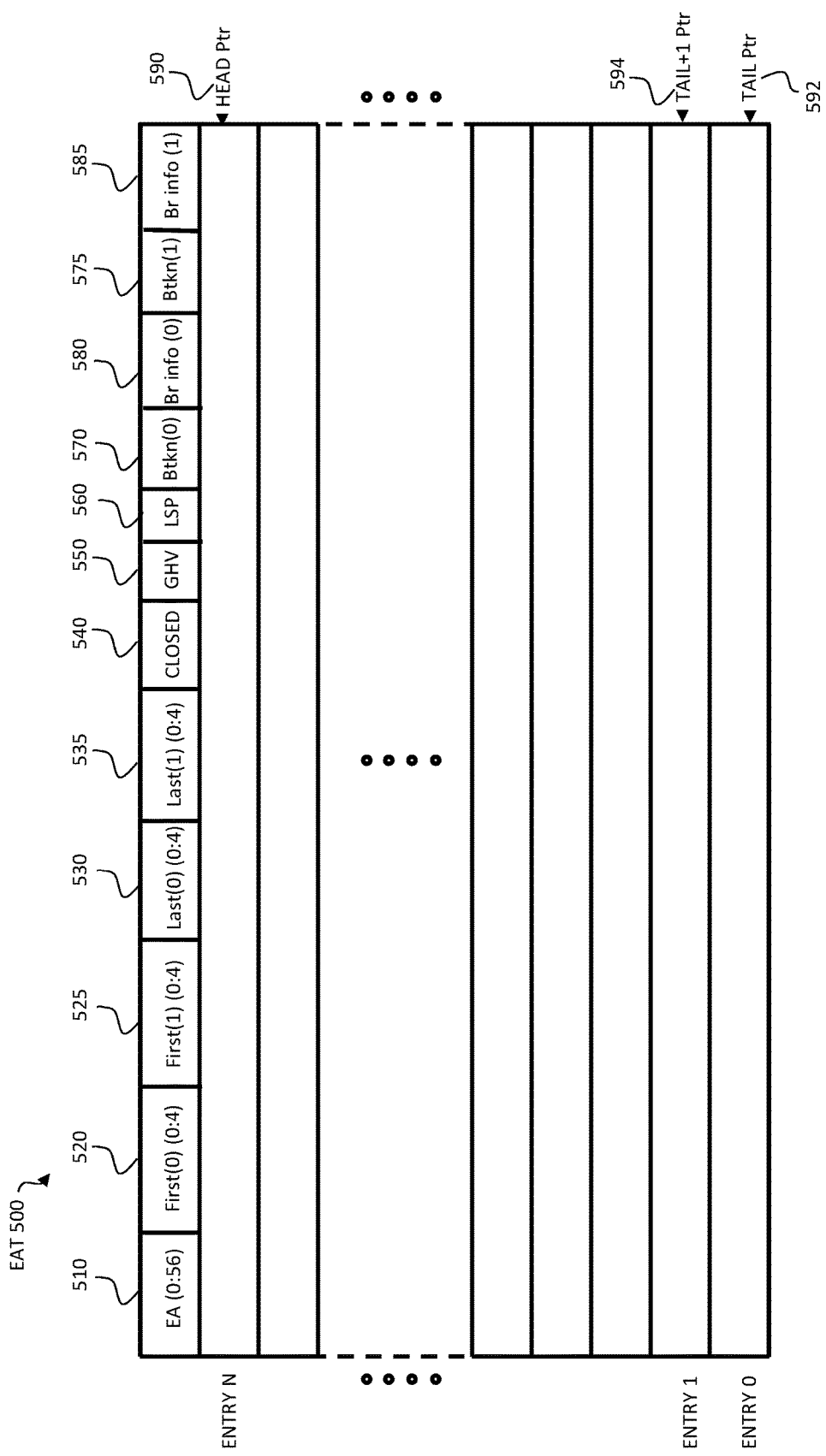
FIG. 5 is an exemplary block diagram of an EAT in accordance with one or more embodiments of the present invention.

FIG. 5 depicts an exemplary effective address table (EAT) structure 500 according to one or more embodiments of the present invention. As shown in FIG. 5, the fields of the EAT 500 comprise a base effective address 510, a first instruction identifier (0) 520, a first instruction identifier (1) 525, a last instruction identifier (0) 530, a last instruction identifier (1) 535, a closed identifier 540, a global history vector field 550, a link stack pointer field 560, a branch taken identifier (0) 570, a branch taken identifier (1) 575, a branch information field (0) 580 and a branch information field (1) 585. A head pointer 590 points to the head, or youngest entry, in the EAT 500. A tail pointer 592 points to the tail, or oldest entry, in the EAT 500. In addition, a tail+1 pointer 594 is provided for pointing to the entry in the EAT 500 that is second to the tail, or oldest, entry in the EAT 500. While only one additional field for the first instruction, last instruction, branch taken and branch information are illustrated, the present invention can utilize more than one additional field. The number of additional fields for the first instruction, last instruction, branch taken and branch information can be based on a number of successive taken branches that utilize the same instruction cache line.

The base effective address 510 is the starting EA of the group of instructions. Each instruction in the group of instructions has the same base EA and then an offset from it. For example, the EA is a 64-bit address comprising bits 0:63. The base EA may comprise bits 0:56 of this EA with bits 57:61 representing the offset from the base EA for the specific instruction within the group of instructions. Bits 62 and 63 point to a specific byte of each instruction. Each address can reference an instruction that is 32 bits long (i.e. 4 bytes), where each byte in memory is addressable. An instruction cannot be further divided into addressable subcomponents, and thus an instruction address will always have bits 62 and 63 set to zero. Therefore, bits 62 and 63 do not need to be stored and can always be assumed to be zero by the EAT 500.

The first instruction identifier field (0) 520 stores the effective address offset bits, e.g., bits 57:61 of the EA for the first instruction in the group of instructions to which the EAT 500 entry corresponds. A combination of the base EA from field 510 and the effective address offset bits in the first instruction identifier field (0) 520 provides the EA for the first instruction in the group of instructions represented by the EAT 500 entry. This first field (0) 520 may be used, as discussed hereafter, for recovering a refetch address and branch prediction information in the event that the pipeline is flushed, for example. The first instruction identifier field (1) 520 operates in a manner similar to the first instruction identifier field (0) 520. The combination of the base EA from field 510 and the effective address offset bits in the first instruction identifier (1) field 525 provides the EA for the first instruction in the group of instructions represented by the EAT 500 entry after a taken branch that can utilize the same EAT 500 entry. The taken branch can utilize the same EAT 500 entry when, for example, the taken branch is directed to the same cache line associated with the first instruction identifier (0) field 520.

The last instruction identifier (0) field 530 stores the effective address offset bits, e.g., bits 57:61 of the EA, for the last instruction in the group of instructions to which the EAT 500 entry corresponds. EAT logic 290 updates this field as additional instructions in the group of instructions represented by the EAT 500 entry are fetched. The EAT logic 290 discontinues updating of this field 530 in the particular EAT 500 entry in response to the EAT 500 entry being closed when a cache line crossing or a predetermined threshold is not met (ex, a number of taken branches exceeds a set number of branches taken, for example, 2). This field will remain intact unless a pipeline flush occurs that clears out a portion of the EAT 500 entry. In such cases, the EAT logic 290 updates this field to store the effective address offset bits of the instruction that is now the new last instruction in the entry as a result of the flush. This field is ultimately used for completion, as discussed hereafter, to release the entry in the EAT 500.

The last instruction identifier (1) field 535 stores the effective address offset bits, e.g., bits 57:61 of the EA, for the last instruction in the group of instructions after a taken branch that uses the same cache line to which the same EAT 500 entry corresponds. If the same cache line is used, the last instruction identifier (1) field 535 operates in a manner similar to the operation of the last instruction identifier (0) field 530. If a different cache line is used, the last instruction identifier (1) field 535 is not utilized.

The closed identifier field 540 is used to indicate that the EAT 500 entry has been closed and no more instruction fetches will be made to fetch instructions for the instruction group corresponding to the EAT 500 entry. An EAT 500 entry may be closed for a variety of different reasons, including a cache line crossing, not meeting a predetermined threshold, i.e., number of taken branches exceeding 2 branches taken), or a flush of the pipeline. Any of these conditions may result in the value in the closed field 540 being set to indicate the EAT entry is closed, e.g., set to a value of "1." This field 540 is used at completion to release an entry in the EAT 500, as discussed in greater detail hereafter.

The global history vector field 550 identifies the global history vector for the first instruction fetch group that created the entry in the EAT 500. The global history vector is used to identify a history of whether branches were taken or not taken, as discussed in greater detail hereafter. The global history vector is used for branch prediction purposes to help in determining, based on the recent history of branches being taken or not taken, whether a current branch is likely to be taken or not.

The link stack pointer field 560 identifies the link stack pointer for the first instruction fetch group that created the entry in the EAT 500. The link stack pointer is another branch prediction mechanism that will be described in greater detail hereafter.

The branch taken (0) field 570 indicates whether the group of instructions corresponding to the EAT 500 entry had a first branch instruction in which the branch was taken. The value in the branch taken (0) field 570 is updated in response to a branch instruction of the instruction group represented by the EAT 500 entry being predicted as taken. In addition, once a branch in the instructions of the EAT 500 entry that uses a different cache line is taken, the EAT 500 entry is also closed by writing the appropriate value to the closed field 540. Since the branch taken (0) field 570 is written speculatively at prediction time, it may need to be replaced with the correct value when the branch is actually executed.

The branch taken (1) field 575 indicates whether the group of instructions corresponding to the EAT 500 entry had a second branch instruction after the first branch was taken. If the group of instructions after the taken branch correspond to the same cache line as instructions prior to the branch, the branch taken (1) field 575 operates in a manner similar to the branch taken (0) field 570.

The branch information (0) field 580 stores miscellaneous branch information that is used for updating branch prediction structures when a branch resolves, or architected EA state when a first branch instruction completes. The branch information (1) field 585 stores miscellaneous branch information that is used for updating branch prediction structures when a branch resolves, or architected EA state when a second branch instruction completes.

Entries in the EAT 500 are accessed using an effective address tag (eatag) that comprises at least two parts: base eatag and an eatag offset. This eatag can be a 10-bit value, which is relatively much smaller than the 64-bit EA. With a 10 bit eatag value, and a EAT 500 having a size of 14 entries, in one exemplary implementation, the eatag is comprised of a first 5 bits, referred to as the base eatag, for identifying an entry within the EAT 500 and a second 5 bits, referred to as the eatag offset, for providing the offset of the specific instruction within the group of instructions represented by the entry in the EAT 500. A first bit in the 5 bits identifying the entry within the EAT 500 may be used as a wrap bit to indicate whether a wrap occurred when going from the topmost entry to the bottom most entry of the EAT 500. This may be used for age detection. The second through fifth bits of the 5 bits identifying the entry within the EAT 500 may be used to index into the EAT to identify the base EA of the instruction, i.e. EA(0:56). The 5 bit offset value may be used to provide, for example, bits 57:61 of the particular instruction's EA. This example eatag is illustrated below:

eatag(0:9)=row(0:4)||offset(0:4)

row(0): Wrap bit for the EAT indicating whether or not a wrap occurred when going from the topmost entry to bottom most entry of the EAT.

row(1:4): Index into 14-entry EAT used to determine EA(0:56) of the instruction.

offset(0:4): Bits 57:61 of the instruction's EA.

Accordingly, unlike contemporary EATs like EAT 300, a new entry in the EAT 500 need not occur for every branch taken. Instead, EAT 500 can allow multiple taken branches to share a single copy of certain fields (ex, the EA 510, CLOSED 540, GHV 550, and LSP 560 fields) in an EAT 500 entry that has already been created by providing additional fields in the EAT 500 to account for additional taken branches (ex, the first instruction identifier (1) field 525, the last instruction identifier (1) field 535, branch taken (1) field 575 and branch information (1) field 585). The sharing of an EAT 500 entry can be predicated upon successive branches being directed to the same cache line.

Moreover, EAT logic 290 can be modified to use EAT 500. Accordingly, the EAT logic can include additional functionality which enables EAT logic 290 to determine which fields are in use, for example, modified EAT logic 290 can determine that last instruction identifier (0) field 530 and/or last instruction identifier (1) field 535 contain information.

Figure 6:
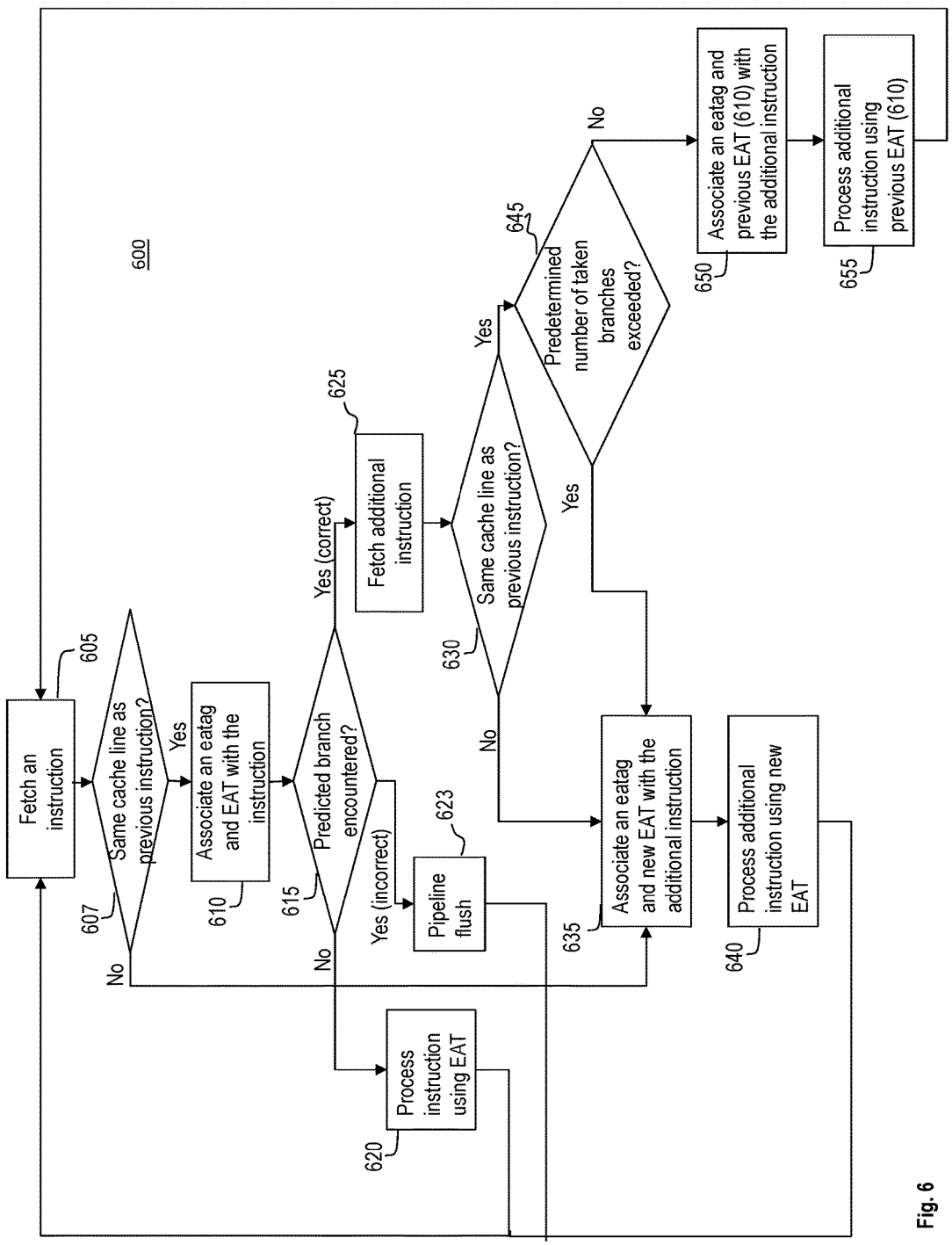
FIG. 6 illustrates a flowchart of an example method for using an EAT with multiple branch taken handling in accordance with one or more embodiments of the present invention.

FIG. 6 illustrates a flowchart of an example method 600 for using an effective address table (EAT 500) with multiple branch taken handling according to one or more embodiments of the present invention. At block 605, one or more instructions to be processed are fetched by the IFU/IDU 106. At block 607, logic associated with the EAT can determine whether one or more instructions fetched at block 605 are directed to the same cache line as previously fetched instructions. If the one or more instructions fetched at block 605 do not utilize the same cache line, method 600 proceed to block 635 where an eatag is associated with each fetched instruction, as well as a new EAT entry.

If the one or more instructions fetched at block 605 utilize the same cache line, method 600 proceed to block 610, where an eatag and an EAT entry can be associated with each fetched instruction. At block 615, logic associated with the EAT can determine whether a predicted branch has been encountered. If a predicted branch has not been encountered, the method 600 proceeds to block 620 where the fetched instruction is processed within a processor pipeline utilizing the associated EAT entry and eatag.

If the predicted branch has been encountered but the associated prediction is incorrect, the method 600 proceeds to block 623 where an instruction pipeline flush is conducted. If the predicted branch has been encountered but the associated prediction is correct, the method 600 proceeds to block 625 where the predicted branch is taken and one or more additional instructions are fetched. At block 630, the EAT logic can determine whether the one or more additional instructions are directed to the same cache line as the previous one or more instructions. If the additional one or more instructions are not directed to the same cache line (i.e., new cache line), the method 600 proceeds to block 635 where an eatag is associated with each additional instruction, as well as a new EAT entry. The new EAT entry is used because the previous EAT entry terminates on the taken branch when a different cache line is utilized (i.e., cache line crossing). Method 600 can proceed to block 640 where the fetched one or more additional instructions are processed within the processor pipeline utilizing the associated eatag and new EAT entry.

If the additional one or more instructions are directed to the same cache line, the method 600 proceeds to block 645 where the EAT logic determines whether a number of taken branches meets a predetermined threshold, for example, 2 or less branches taken. If the EAT logic determines that the number of taken branches does not meet the predetermined threshold (ex, exceeding 2 taken branches), the method 600 proceeds to block 635 where an eatag is associated with each additional instruction, as well as a new EAT entry.

If the EAT logic determines the number of taken branches meets the predetermined threshold, the method 600 proceeds to block 650 where an eatag is associated with each additional instruction, but the instruction is associated with the EAT entry from the previous instruction (i.e., EAT entry at block 610). Accordingly, the one or more additional instructions can utilize the same fields (ex, EA, CLOSED, GHV, LSP, etc.) of the EAT entry at block 610. Method 600 can proceed to block 655 where the fetched one or more additional instructions are processed within the processor pipeline utilizing the associated eatag and the same EAT entry as the one or more instructions at block 610. In addition, blocks 650 and 655 can use additional fields in EAT 500 to account for tracking more than one taken branch. For example, method 600 can utilize multiple first instruction identifier, last instruction identifier, branch taken and branch information fields. The number of multiple fields can be limited by the threshold associated with block 645.

By implementing the EAT 500 described above, multiple taken branches are capable of sharing a copy of certain fields in an EAT entry. This improves on the typical OoO processor where a greater amount of chip area and power overhead are required to track additional new EAT entries due to branches taken.

Figure 7:
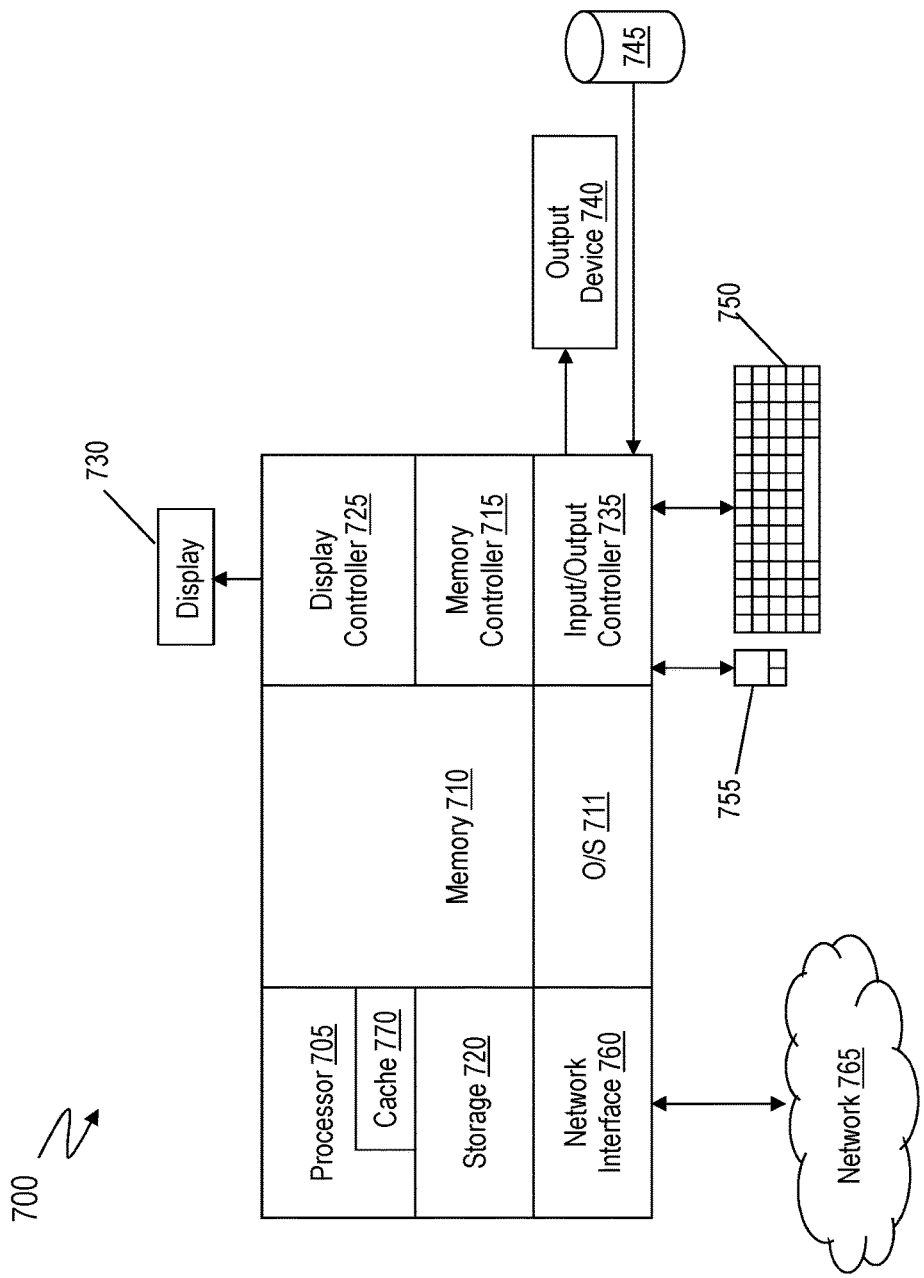
FIG. 7 depicts a block diagram of a computer system for implementing some or all aspects of one or more embodiments of the present invention.

Turning now to FIG. 7, a block diagram of a computer system 700 for implementing some or all aspects of one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a mobile device, personal computer, workstation, minicomputer, or mainframe computer.

In an exemplary embodiment, as shown in FIG. 7, the computer system 700 includes a processor 705, memory 712 coupled to a memory controller 715, and one or more input devices 745 and/or output devices 747, such as peripherals, that are communicatively coupled via a local I/O controller 735. These devices 747 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 747, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system 700, a semiconductor based microprocessor (in the form of a microchip or chip set), a microprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor 705 to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing an EAT with multiple branch taken handling in an OoO processor can be embodied, in whole or in part, in computer program products or in computer systems 700, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for out-of-order execution of one or more instructions by a processing unit, the method comprising:
   fetching, by an instruction fetch unit, a first instruction from an instruction cache;
   associating, by an effective address table logic, an entry in an effective address table (EAT) with the first instruction;
   fetching, by the instruction fetch unit, a second instruction from the instruction cache, wherein the first instruction occurs before a branch has been taken and the second instruction occurs after the branch has been taken;
   associating, by the effective address table logic, at least a portion of the entry in the EAT associated with the first instruction in response to the second instruction utilizing a cache line utilized by the first instruction;
   processing the first instruction and the second instruction through a processor pipeline utilizing the entry of the EAT; and
   processing the second instruction utilizing the entry of the EAT based at least in part on a number of branches taken meeting a predetermined threshold.

2. The computer-implemented method of claim 1 further comprising associating, by the effective address table logic, an effective address tag (eatag) with the fetched first instruction and second instruction, the eatag comprising a base eatag that points to the entry in the EAT and an eatag offset identifying the fetched instruction in association with the entry in the EAT.

3. The computer-implemented method of claim 1, wherein in response to the predetermined threshold not being met, the second instruction is associated with a new EAT entry.

4. The computer-implemented method of claim 1, wherein the entry of the EAT comprises two first instruction identifiers, two second instruction identifiers, two branch taken fields and two branch information fields.

5. The computer-implemented method of claim 1, wherein in response to the second instruction not utilizing the cache line utilized by the first instruction, the second instruction is associated with a new EAT entry.

6. The computer-implemented method of claim 1, wherein processing the first instruction and the second instruction through a processor pipeline utilizing the entry of the EAT occurs via an out-of-order processor.

7. A system comprising:
   a memory having computer readable instructions; and
   one or more processors;
   an instruction fetch unit (IFU) configured for fetching a first instruction from an instruction cache; and
   an effective address table logic configured to associate an entry in an effective address table (EAT) with the first instruction;
   wherein the IFU is further configured to fetch a second instruction from the instruction cache, wherein the first instruction occurs before a branch has been taken and the second instruction occurs after the branch has been taken; and
   wherein the effective address table logic is further configured to associate at least a portion of the entry in the EAT associated with the first instruction in response to the second instruction utilizing a cache line utilized by the first instruction;

wherein the one or more processors are configured to process the first instruction and the second instruction through a processor pipeline of the one or more processors utilizing the entry of the EAT; and wherein the one or more processors are further configured to process the second instruction utilizing the entry of the EAT occurs based at least in part on a number of branches taken meeting a predetermined threshold.

8. The system of claim 7, wherein the effective address table logic is further operable to associate an effective address tag (eatag) with the fetched first instruction and second instruction, the eatag comprising a base eatag that points to the entry in the EAT and an eatag offset identifying the fetched instruction in association with the entry in the EAT.

9. The system of claim 7, wherein in response to the predetermined threshold not being met, the second instruction is associated with a new EAT entry.

10. The system of claim 7, wherein the entry of the EAT comprises two first instruction identifiers, two second instruction identifiers, two branch taken fields and two branch information fields.

11. The system of claim 7, wherein in response to the second instruction not utilizing the cache line utilized by the first instruction, the second instruction is associated with a new EAT entry.

12. The system of claim 7, wherein processing the first instruction and the second instruction through a processor pipeline utilizing the entry of the EAT occurs via an out-of-order processor.

13. A computer program product comprising a computer readable storage medium having program instructions embodied therewith, the program instructions executable by a processor to cause the processor to perform operations comprising:

fetching a first instruction from an instruction cache;

associating an entry in an effective address table (EAT) with the first instruction;

fetching a second instruction from the instruction cache, wherein the first instruction occurs before a branch has been taken and the second instruction occurs after the branch has been taken;

associating at least a portion of the entry in the EAT associated with the first instruction in response to the second instruction utilizing a cache line utilized by the first instruction;

processing the first instruction and the second instruction through a processor pipeline utilizing the entry of the EAT.

14. The computer program product of claim 13 further comprising associating an effective address tag (eatag) with the fetched first instruction and second instruction, the eatag comprising a base eatag that points to the entry in the EAT and an eatag offset identifying the fetched instruction in association with the entry in the EAT.

15. The computer program product of claim 13, wherein in response to the predetermined threshold not being met, the second instruction is associated with a new EAT entry.

16. The computer program product of claim 13, wherein the entry of the EAT comprises two first instruction identifiers, two second instruction identifiers, two branch taken fields and two branch information fields.

17. The computer program product of claim 13, wherein in response to the second instruction not utilizing the cache line utilized by the first instruction, the second instruction is associated with a new EAT entry.

* * * * *